(12) United States Patent
Stockert

(10) Patent No.: US 9,681,651 B2
(45) Date of Patent: Jun. 20, 2017

(54) QUICK RELEASE REUSABLE SANDBAG SINKER

(71) Applicant: Greggory Howard Stockert, Portland, OR (US)

(72) Inventor: Greggory Howard Stockert, Portland, OR (US)

(*) Notice: Subject to any disclaimer, the term of this patent is extended or adjusted under 35 U.S.C. 154(b) by 256 days.

(21) Appl. No.: 14/458,647

(22) Filed: Aug. 13, 2014

(65) Prior Publication Data
US 2015/0075059 A1     Mar. 19, 2015

Related U.S. Application Data

(60) Provisional application No. 61/960,292, filed on Sep. 16, 2013.

(51) Int. Cl.
*A01K 95/00* (2006.01)
*A01K 95/02* (2006.01)

(52) U.S. Cl.
CPC ............ *A01K 95/005* (2013.01); *A01K 95/02* (2013.01)

(58) Field of Classification Search
CPC ........ A01K 75/04; A01K 75/06; A01K 85/00; A01K 85/02; A01K 91/03; A01K 91/04; A01K 91/06; A01K 91/08; A01K 93/00; A01K 95/005; A01K 95/00; A01K 95/02; A01K 97/24
See application file for complete search history.

(56) References Cited

U.S. PATENT DOCUMENTS

| | | | | |
|---|---|---|---|---|
| 63,510 A * | 4/1867 | Hall | B65D 33/1675 | 24/16 PB |
| 2,308,238 A * | 1/1943 | Baker | A01K 95/00 | 24/908 |
| 3,854,235 A * | 12/1974 | Thompson | A01K 95/005 | 43/43.12 |
| 3,993,222 A * | 11/1976 | Briggs | A61J 1/05 | 222/107 |
| 4,077,151 A * | 3/1978 | Johnson | A01K 95/005 | 206/315.11 |
| 4,821,449 A * | 4/1989 | Hafer | A01K 95/00 | 43/41.2 |
| 5,499,472 A * | 3/1996 | Krenn | A01K 95/00 | 43/43.1 |
| 6,311,697 B1* | 11/2001 | Gibson | A45D 8/34 | 132/210 |
| 9,089,186 B1* | 7/2015 | McCloskey | A44B 1/18 | |
| 2008/0207083 A1* | 8/2008 | Schnuckle | A63H 27/10 | 446/220 |

* cited by examiner

*Primary Examiner* — Cassandra Davis
(74) *Attorney, Agent, or Firm* — Ingenium Patents LLC; Peter R. Kramer

(57) ABSTRACT

A fishing sinker consisting of a cloth bag which is open at the top. The bag is partially filled and then the upper part of the bag is gathered together and closed by means of an eye pin and rubber band attached to the eye of the eye pin. The eye pin is laid across the gathered fabric then the rubber band is pulled around the gathered fabric and over the end of the eye pin to provide closure. The bag can thus be emptied and retrieved by pulling firmly on the fishing line, which is also attached to the metal pin, which is tethered to the bottom of the bag.

3 Claims, 7 Drawing Sheets

QUICK RELEASE REUSABLE SANDBAG SINKER

BACKGROUND OF THE INVENTION

Field of the Invention

Figure 1:
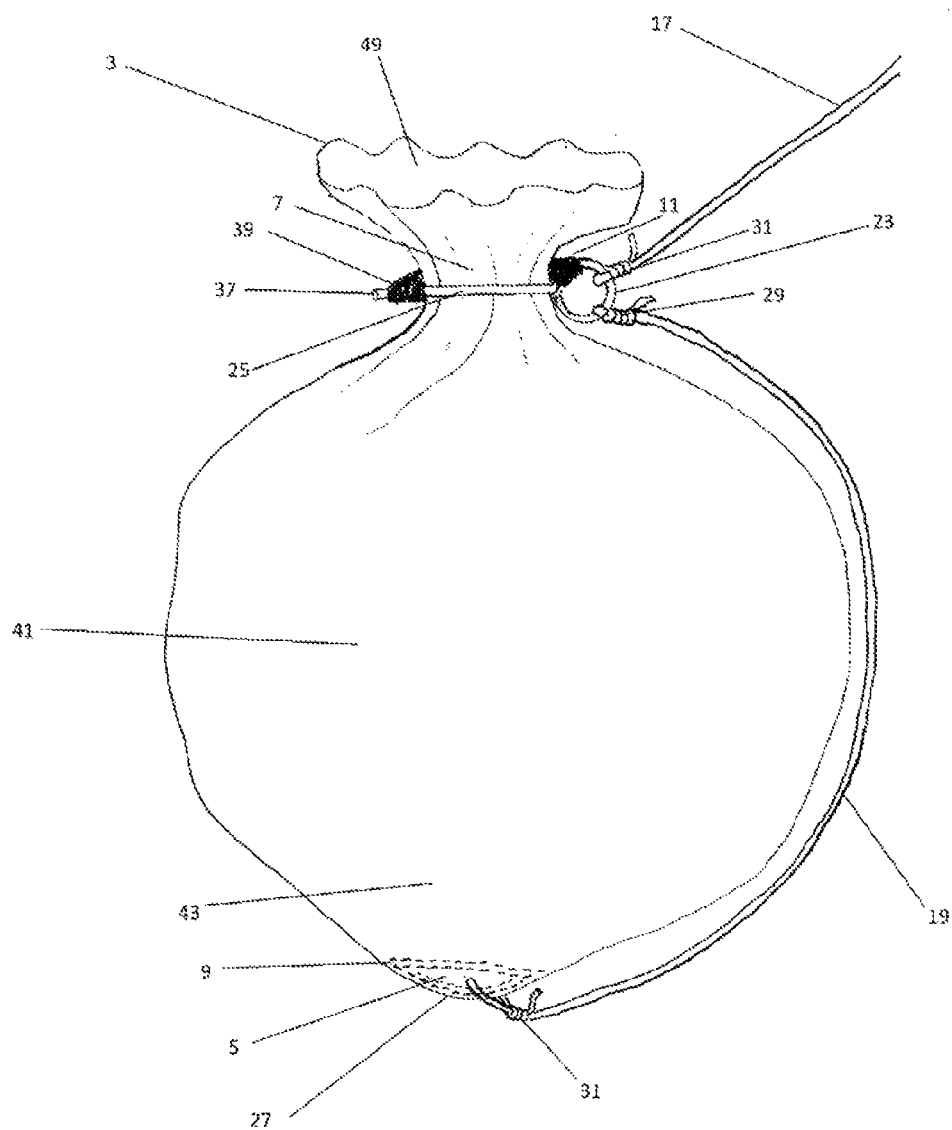

This inventive disclosure relates to fishing sinkers for use in moving waters or for use in a body of water where the sinker must be placed at a considerable distance from land beyond the reach of manual casting.

Description of Related Art Including Information Disclosed Under 37 CFR 1.97 and 1.98.

The means used to anchor fishing lines in running water have previously consisted of makeshift sinkers fashioned from heavy objects such as bricks, rocks, concrete chunks, bundles of railroad spikes, pieces of lead or other foreign objects. These foreign objects have been typically left in the rivers after use because the sinker is too heavy to retrieve due to the limitations of fishing line tensile strength.

BRIEF SUMMARY OF THE INVENTION

The subject matter of this disclosure includes apparatuses and methods, which serve the purpose of providing a means of securing fishing lines in bodies of moving water, such as rivers or other locations where there may be swift currents. The Quick Release Reusable Sandbag Sinker is a cloth container with a mechanism that allows an angler to empty sand or gravel from the bag by simply pulling on the fishing line. These are particularly useful where the flow of water may be rapid thereby requiring a very heavy sinker with mass that is unsuitable for casting. One embodiment is comprised of a fabric bag having an opening at the top. The open end can be closed with an eye pin and rubber band closure. Opposite the open end of the bag an attachment area is positioned which can be used to secure a tether running from the bottom of the bag to the eyelet of the eye pin. The fabric bag may be filled with high density particles, such as sand, to provide substantial mass. The open end is then closed by means of the eye pin and rubber band. The sinker may then be manually placed in a river, stream, or lake. A fishing line is attached to the eyelet of the eye pin. When the sinker needs to be retrieved, the angler needs to simply pull the fishing line with sufficient force to release the rubber band from the straight end of the pin thereby discharging the high density contents of the bag. The empty bag along with eye pin, rubber band and tether may be retrieved by the angler.

BRIEF DESCRIPTION OF THE SEVERAL VIEWS OF THE DRAWING(S)

Figure 2:
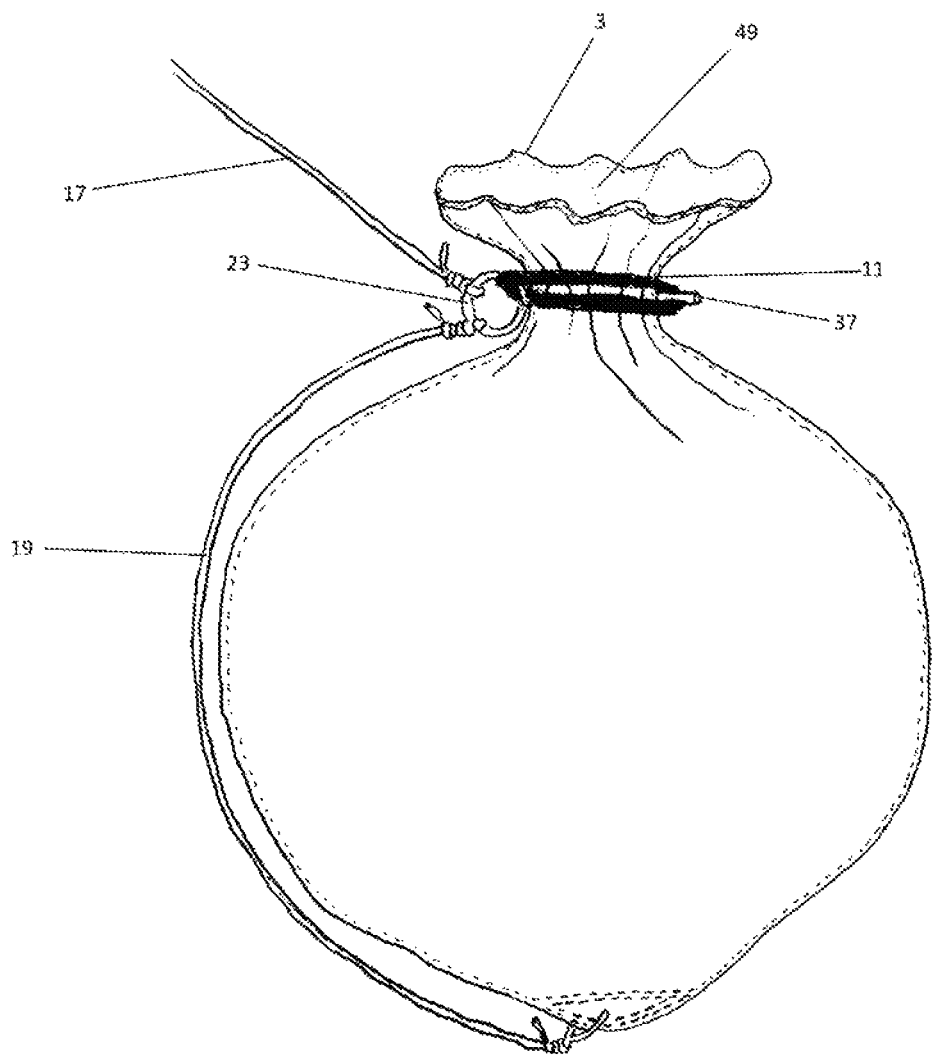

FIG. 1 Perspective rear view of embodiment with tether connected directly to eye pin FIG. 2 Perspective front view of the embodiment from FIG. 1

Figures 3A, 3B:
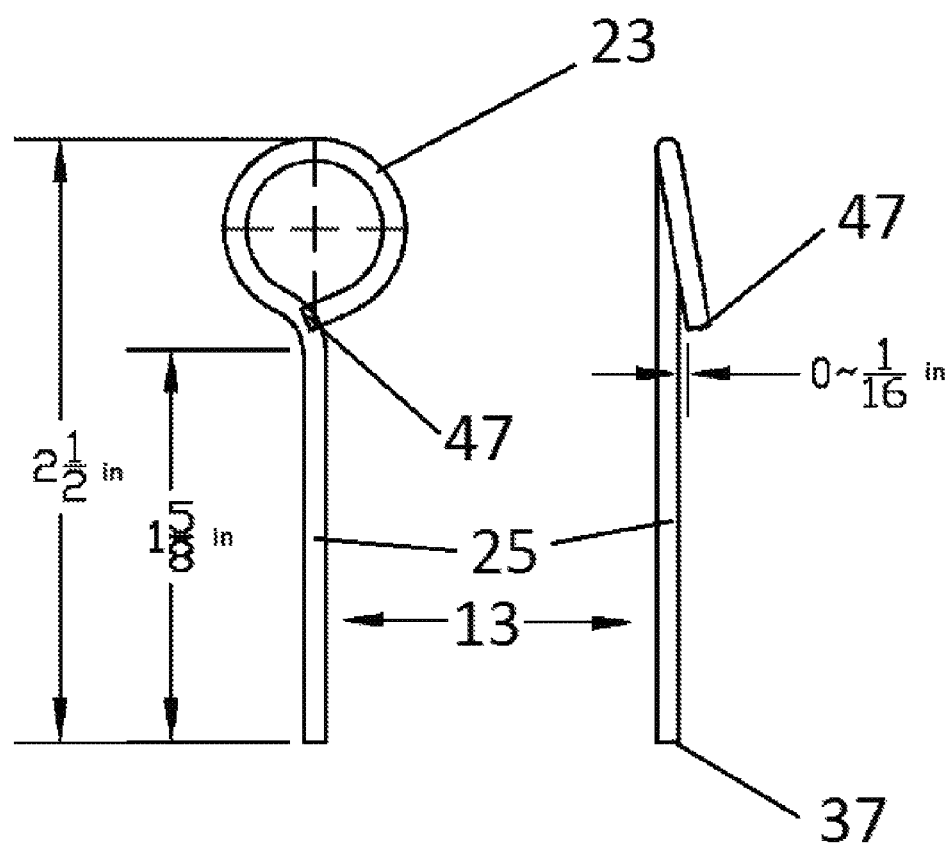

FIG. 3A Front view of eye pin

FIG. 3B Side view of eye pin

Figure 4:
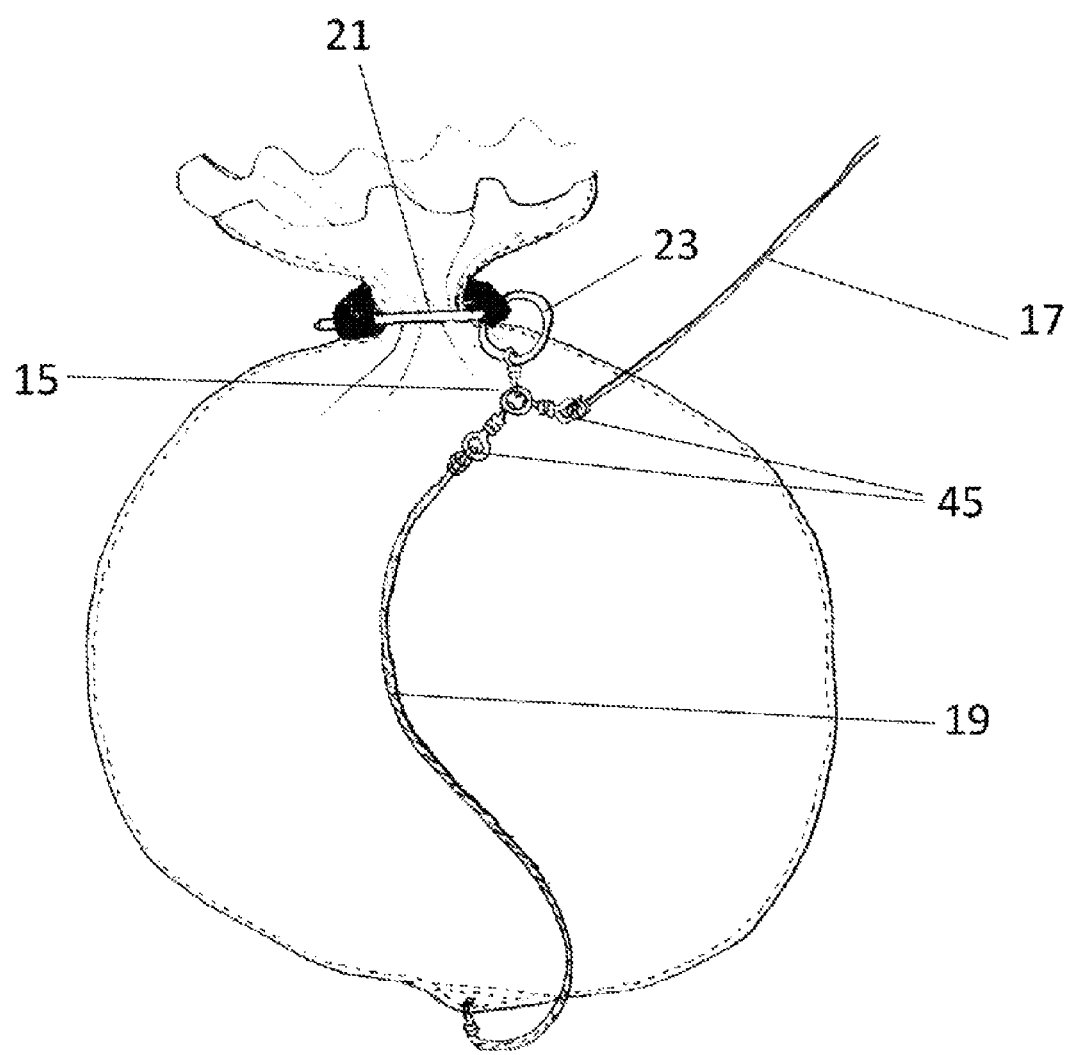

FIG. 4 Perspective front view of embodiment having a 3-way swivel

Figure 5:

FIG. 5 Perspective rear view of the embodiment of FIG. 4

Figure 6:
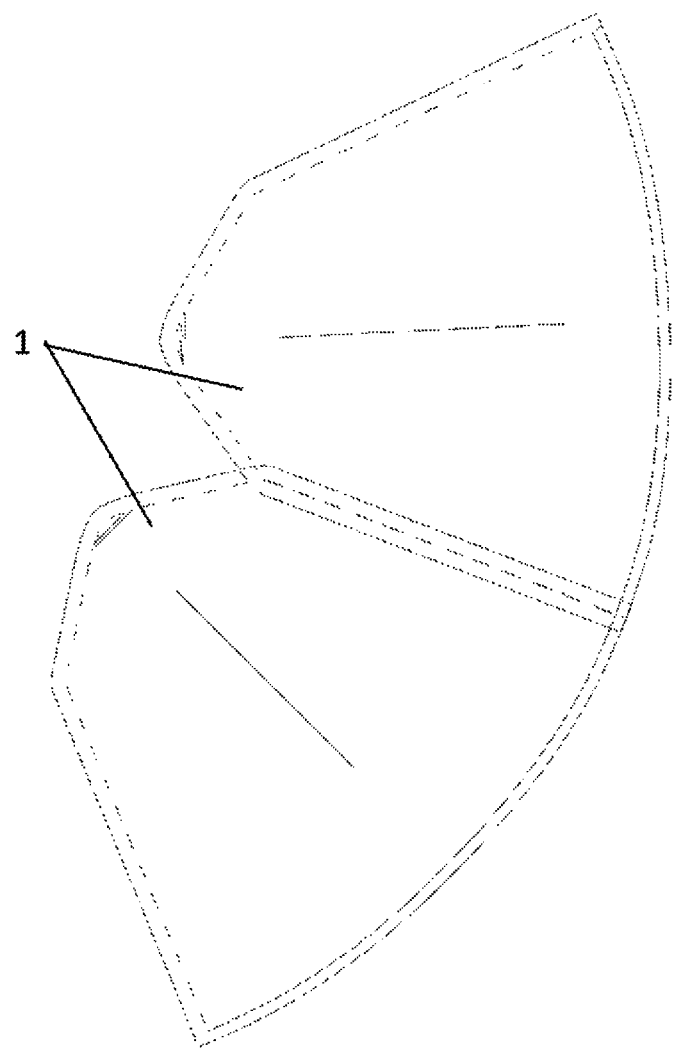

FIG. 6 Two fabric pieces for construction of bag

Figure 7:
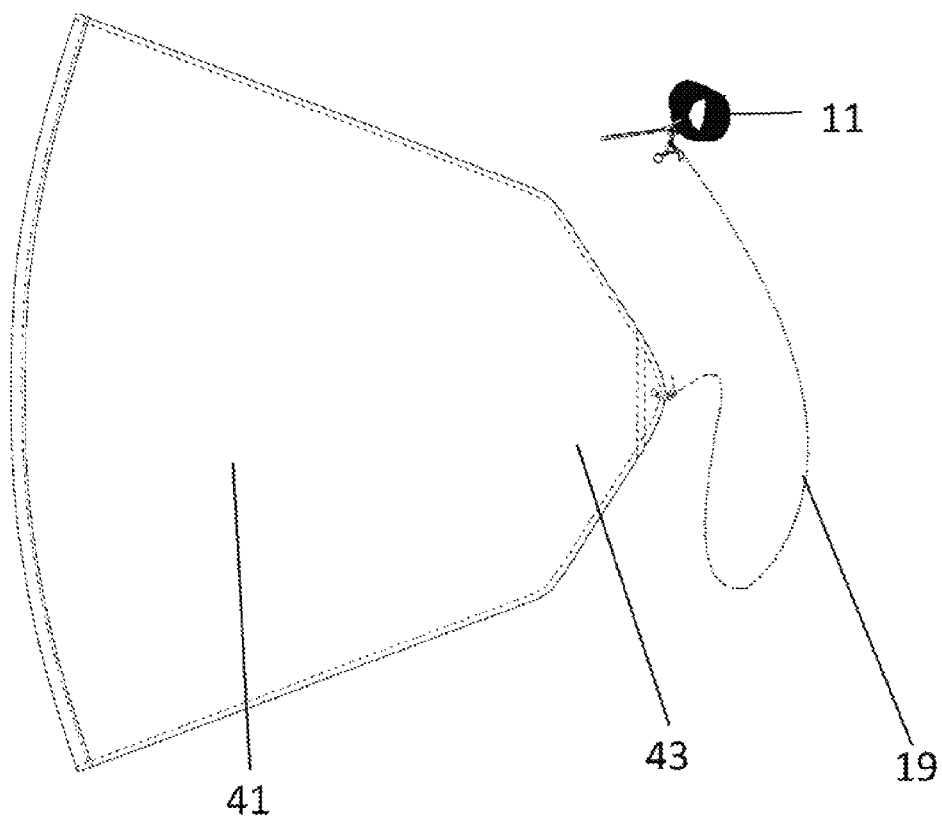

FIG. 7 Open bag with free closure held by tether

DETAILED DESCRIPTION OF THE INVENTION

The Quick Release Reusable Sandbag Sinker is a cloth container with a mechanism that allows an angler to empty sand or gravel from the bag by simply pulling on the fishing line. Once emptied, the bag is easily retrieved and is reusable. A first embodiment is shown in FIGS. 1 and 2. The bag is formed from two pieces of cloth sewn together 1 as shown in FIG. 6. The bag has an opening 49 at the top 3, FIG. 1, and is slightly pointed at the bottom 27. The fabric at the bottom of the bag is folded inward so that when the two pieces are sewn together an attachment area 5 is formed where there are four layers of fabric. The attachment area has four rows of reinforcement stitching 9 for added strength. Alternatively, a fabric loop may be formed at the attachment area, or a metal ring can be attached at the attachment area. The top edge of the bag may have bias tape or a rolled hem. The bag has a upper portion 41 and a lower portion 43. When the bag is filled but not yet closed, the lower portion is substantially conical and the upper portion is substantially frustoconical. The periphery of the bag forms an angle at the junction of the lower and upper portions. The widest circumference at the top of the fully opened bag is preferably twice the circumference at the junction of the upper portion and lower portion. The lower portion therefore has a more pronounced taper than the upper portion with the sides of the lower portion converging at the attachment area. The finished bag may have dimensions such as 16 inches in height, 40 inch circumference at the top, and 20 inch circumference at the junction of the upper portion and lower portion. Other suitable dimensions may also be used.

A rubber band 11 is secured inside the eyelet 23 of an eye pin 21. The eye pin, FIG. 3A, is a metal piece comprised of a pin shaft 25 and eyelet. The straight shaft of the eye pin has a first terminus 37 at one end of the pin. At the other end of the eye pin is an eyelet 23. A second terminus 47 of the metal rod from which the eye pin was constructed is at the eyelet end of the eye pin and is arranged so that it slightly overlaps the pin shaft as shown FIG. 3. A preferred embodiment of the eye pin is constructed from a brass rod having diameter $3/32$ inches with the shaft 25 having length of $1 5/8$ inches and with the eyelet 23 having an inner diameter of $9/16$ inches. The rubber band is comprised of an elastomer, preferably a polymer formed from ethylene propylene diene monomer (EPDM). Preferred dimensions of the rubber band are 1 inch in width and with $1/32$ inches thickness. The rubber band is secured to the eyelet 23 of eye pin 21 as shown. The eyelet may be soldered closed after the rubber band has been affixed to the eyelet. Alternatively, the eye pin may be fabricated from a shape-memory alloy such as Ni—Ti which would allow opening the eyelet and reclosing without soldering. Together the rubber band and eye pin form a closure for the bag. The bag is closed by gathering the fabric near the top to form a neck 7. The eye pin is laid across one side of the neck and the rubber band is stretched around the opposite side of the neck. The terminus 37 of shaft 25 is inserted into the loop 39 of the rubber band thereby securely closing the bag. A tether line 19 is attached to eyelet 23 at one end of the tether line and the tether line is attached at its other end to the attachment area 5. Braided 80 pound line is suitable for use as the tether line. Any suitable means of attachment of the tether line may be used. Attachments of the tether line to the eyelet and attachment area may be accomplished with knots. FIG. 1 shows a first knot 33 for attachment of the tether line at the attachment area 5 and with a second knot 29 which attaches the tether line to the eyelet 23.

Operation

To use the quick release sandbag sinker, an angler would fill the bag with sand, gravel or other suitable matter. Typically an angler would transport the bag using a boat to a location at substantial distance from land. The bag is filled with sand or gravel. The bag is closed by gathering the fabric near the top to form a neck 7. Eye pin 23 is laid across one side of the neck 7 and the rubber band 11 is stretched around the opposite side of the neck. The terminus 37 of shaft 25 is inserted into the loop 39 of the rubber band thereby securely closing the bag. A main fishing line 17 is attached to the eyelet 23. In this example, a main fishing line 17 is attached to the eyelet by tying a third knot 31. When the angler wishes to retrieve the bag, firm force is applied to the main fishing line which urges the shaft of the eye pin to slip out of rubber band loop 39 thereby releasing the eye pin and allowing the bag to open. As the angler continues to pull the main fishing line the contents of the bag are discharged and the bag can be easily retrieved.

A second embodiment of the invention is shown in FIGS. 4 and 5. This embodiment differs from the first embodiment in that a 3-way swivel 15 is attached to the eyelet 23 of eye pin 21 and with the main fishing line 17 and tether line 19 each attached respectively to the two remaining outer rings 45 of the 3-way swivel. Attachment of the tether line to the attachment area is the same as is shown for the first embodiment. This second embodiment is manipulated by an angler in the same manner as for the first embodiment once the sinker is assembled. Pulling force applied by means of the main fishing line triggers release of the closure and discharge of the contents of the bag.

I claim:
1. A sinker for use by an angler comprising,
a bag comprised of a woven or nonwoven fabric, said bag having an open top and a bottom,
said bag having an upper portion, said upper portion positioned above a pointed lower portion at the bottom of the bag,
said sinker having a tether line,
said bag having a reinforced attachment area secured said tether line,
an eye pin, said eye pin having a straight shaft attached to an eyelet,
a circular elastomeric band, said circular elastomeric band attached to said eyelet thereby forming a closure mechanism,
said circular elastomeric band configured such that the top of the bag may be securely closed and thereby can be readily opened when the angler applies pulling force via a fishing line attached to said eye pin by the angler.
2. The sinker of claim 1 further comprising,
a configuration wherein said tether line connects said attachment area to said eyelet.
3. The sinker of claim 1 further comprising,
a 3-ways swivel, said 3-say swivel being attached to said eyelet,
a configuration wherein said tether line connects said attachment area to said 3-way swivel.

* * * * *